Jan. 3, 1928.
V. LINK
1,654,690
BRAKE
Filed July 1, 1926
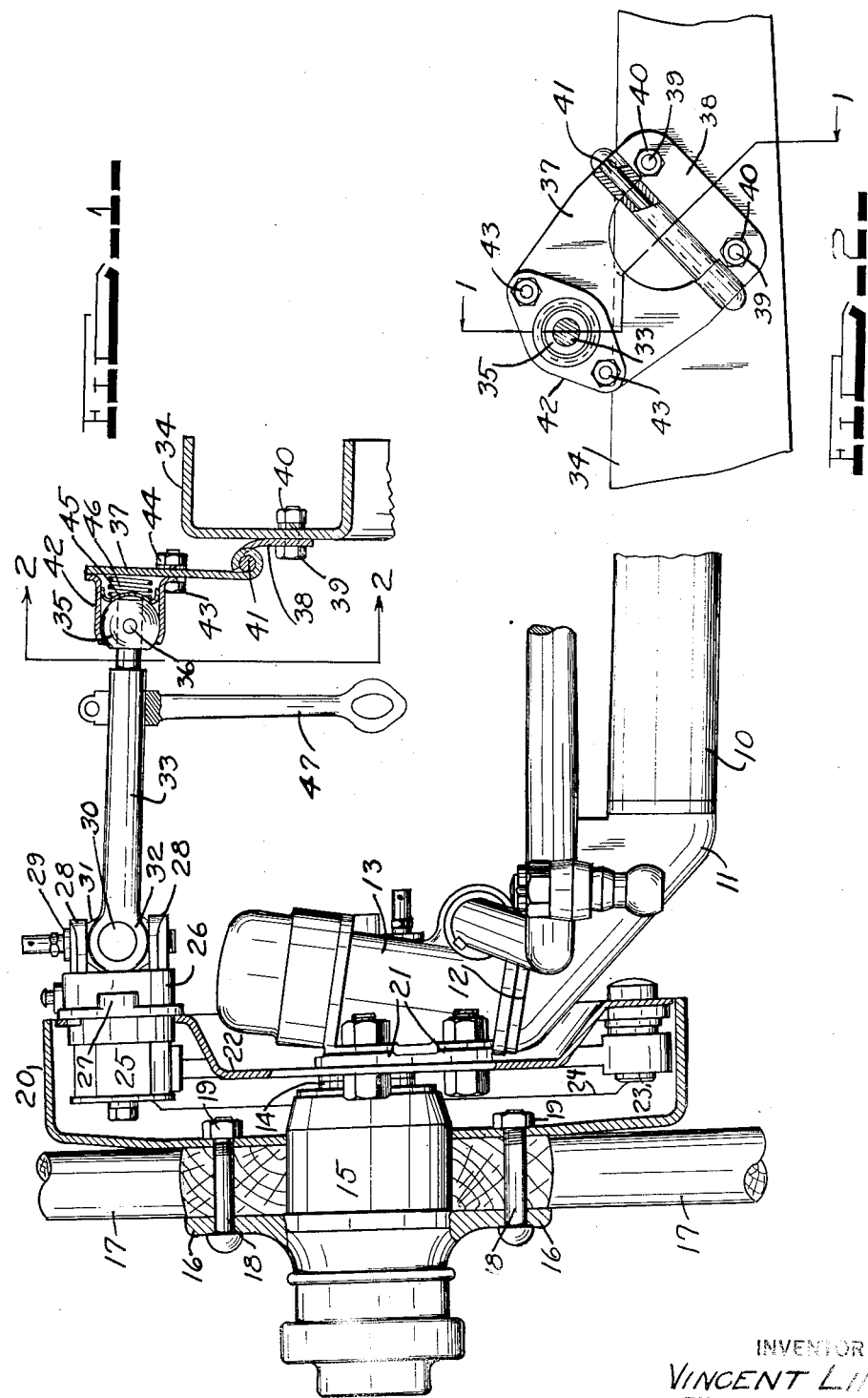
INVENTOR
VINCENT LINK
BY
ATTORNEY Patented Jan. 3, 1928.

1,654,690

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed July 1, 1926. Serial No. 119,887.

This invention relates to brake mechanisms for motor vehicles, and particularly to means for anchoring the free ends of the brake-operating shafts at the vehicle frame, the principal object being to provide a simple construction that is efficient in operation and economical to manufacture.

Another object is to provide an improved method of anchoring the free end of a brake-actuating shaft to the frame of a motor vehicle in such a manner as to insure easy and efficient operation of the brake mechanism no matter what position the frame may assume relative to the vehicle axle.

Still another object is to provide means for flexibly mounting the free end of a brake-actuating shaft to the chassis frame.

A further object is to provide a support for the inner end of a front wheel brake actuating shaft of a motor vehicle, comprising a supporting member provided with an end swingable in the direction of the axis of said shaft and pivotally mounted on a frame side member of said vehicle at relatively widely separated points, the inner end of said shaft being pivotally and rotatably supported by the end of said supporting member whereby said shaft is capable of both rotary and axial movement in respect to said frame.

These being among the objects of the present invention, the same consists of certain features of construction and combinations of parts to be hereinafter described and then claimed having the above and other objects in view.

In the accompanying drawing, which illustrates a suitable embodiment of the present invention:—

Figure 1 is a partial section taken vertically through the left front wheel of a motor vehicle and on the line 1—1 of Figure 2, showing the frame side member and the method of mounting the inner end of the brake shaft thereto.

Figure 2 is a side view taken on the line 2—2 of Figure 1 showing the hinge member of the present invention.

Referring to the accompanying drawing, in which like numerals refer to like parts throughout the views, the embodiment of the present invention is shown in connection with the front wheel brake mechanism of a motor vehicle to which it is particularly adapted. In Figure 1 is shown a front axle 10 of the tubular type having an end member 11, which terminates in an upwardly extending shaft 12 upon which the steering knuckle 13 is pivotally supported. The knuckle 13 is provided with the conventional wheel spindle 14, upon which the wheel hub 15 is supported and is free to rotate. The hub 15 is provided with a flange portion 16 against which the wheel spokes 17 abut and which are secured thereto by bolts 18 and nuts 19, which also serve to support and secure the brake drum 20 to the hub 15 in concentric relation therewith. The knuckle 13 is formed with flanges 21, to which the brake drum dust cover 22 is secured in concentric relation with the drum 20, which cover 22 closes the open end thereof.

Within the brake drum 20 and pivotally supported on adjacent pins 23 secured to the dust cover 22 are the two brake shoes 24, the outer surfaces of which normally lie just out of contacting relationship with the inner surface of the drum 20, and whose free ends rest on and are drawn against the expanding cam 25 by a spring (not shown) extending therebetween. The cam 25 is formed on the end of a short shaft which projects through the dust cover 22 and is rotatably supported in the bracket 26, which also projects through the dust cover 22 and is secured thereto by screws or bolts which pass through the flanges 27 thereof.

In constructions of this type, wherein the brake-operating shaft is supported at one end on the frame of the vehicle, and the other end is on, or on a part supported by, the end of the axle, the distance between the point of support on the frame and on the axle varies with the movement of the frame relative to the axle, due to both horizontal and vertical movement of the springs which support the frame on the axle. The present invention deals with means for compensating for this action.

As has been described, the bracket 26 is secured to the dust cover 22 which supports it and which is relatively stationary in respect to the axle 10, by the screws or bolts which pass through the dust cover 22 and into the flanges 27. As has also been described, the bracket 26 rotatably supports a short shaft having the cam 25 formed on an end thereof. The end of the shaft opposite the cam 25 is formed to provide two arms 28 which serve as one yoke of a universal joint comprising cross pins 29 and 30, a block 31 and a yoke 32 formed on the end of the operating shaft 33. The operating shaft 33 extends inwardly toward, and terminates short of, the vehicle side frame member 34, and is provided with a ball member 35 which is secured to the extreme end of the shaft 33 by a pin 36. This ball end 35 is received in a socket secured to one portion 37 of a hinge, the other portion 38 being secured to the vehicle frame side member 34 by bolts 39 and nuts 40. The first-mentioned portion 37 is hinged to the last-mentioned portion 38 by means of a hinge pin 41. It is preferable in this construction that the points of pivot of the member 37 relative to the frame 34 be widely spaced in order that the bending stresses to which the pin 41 and hinge joint in general is subjected upon application of the brake, is as small as possible. For this reason, in the construction shown the hinged end of the member 37 is bifurcated to provide widely separated points of support therefor on the pin 41. In this manner unusual forces acting on the hinge joint through pressure applied to the brakes through the lever 47 are reduced, and a construction is provided which is not only strong but which is capable of maximum resistance to wear.

The socket comprises a housing 42 having a portion spherical in shape to provide a seat for the ball 35 and is apertured to permit the shaft 33 to extend therefrom, and is secured to the hinge portion 37 by bolts 43 and nuts 44. Contained within the housing is a pressed metal cup 45 provided with a spherical seat which is pressed against a portion of the ball end 35 by a coiled compression spring 46, which abuts against the flat surface of the hinge portion 37. A rock lever 47, which is connected through a rod to the brake pedal of the vehicle, is secured to the shaft 33 and is adapted to cause movement thereof when rotated about its axis, thereby acting to cause rotation of the cam 29, and the spreading of the brake shoes 24 into contact with the drum 20 to effect a braking action on the vehicle wheel.

The action of the construction is, of course, apparent. Because of the springing of the vehicle frame on the axle and because of the side sway of the body in respect to the axle, the distance between the universal joint connection at the brake cam and the point of support at the vehicle frame side member is constantly changing. It will be seen that as the frame member 34 moves relative to the axle 10 the upper portion 37 of the hinge will swing or pivot on its pin 41 either one way or the other, according to whether the frame moves up or down or the body sways one way or the other. The socket connection between the end of the operating shaft 33 and the hinge portion 37 will allow the shaft 33 to be rotated and consequently the brakes to be operated at any position of the frame member 34. This is also particularly true when the wheels are turned in steering, as the distance mentioned before may also vary during such movement.

The hinge construction will function equally as well if it is positioned either vertically or horizontally as it does when positioned at an angle as shown in Figure 2.

Other advantages are readily apparent and it can be seen that the construction is simple and consists of few parts, which can be stamped from sheet metal, making production on a large scale very economical.

Formal changes may be made in the specific embodiment of the invention described without departing from the spirit and substance of the broad invention the scope of which is commensurate with the appended claims.

What I claim is:

1. In a motor vehicle, braking means for a wheel thereof, a brake-operating shaft extending inwardly from said means, and means comprising a hinge having a pivot intermediate its ends and supported at relatively widely separated points on the frame of said vehicle for supporting the inner end of said shaft.

2. In a vehicle braking mechanism, an axle carrying a brake support, a brake-operating shaft supported at one end by said support and terminating at its other end in a ball, a hinged member pivotally secured at a plurality of points to the frame of said vehicle at one end, and means for pivotally supporting said ball at the other end of said member.

3. In a motor vehicle, a frame and an axle, braking means carried by said axle, a brake-operating shaft having one end supported by said braking means and the other end terminating in a ball short of said frame, and a member having one end pivotally supported on said frame and provided with means at its other end for supporting said ball, said member being bifurcated at its pivoted end to provide a pair of relatively widely separated hinged supports for the same.

4. In a motor vehicle, a brake support carried by an axle, a brake cam shaft carried by said support, a brake-operating shaft universally connected to said cam shaft and extending inwardly therefrom, said operating shaft terminating in a ball end, and a hinge, one-half of which is secured to the frame of said vehicle and the other half of which is bifurcated and straddles the first-mentioned half to provide a pair of relatively widely spaced pivot points and is provided at its opposite end with a socket for universally supporting said ball end and permitting movement thereof towards and away from said frame.

Signed by me at Detroit, Michigan, U. S. A., this 28th day of June, 1926.

VINCENT LINK.